(12) United States Patent
Cooper et al.

(10) Patent No.: US 6,571,027 B2
(45) Date of Patent: May 27, 2003

(54) METHOD AND DEVICES FOR TIME DOMAIN DEMULTIPLEXING OF SERIAL FIBER BRAGG GRATING SENSOR ARRAYS

(75) Inventors: David J. F. Cooper, Toronto (CA); Peter W. E. Smith, 77 Avenue Road, Suite 306, Toronto, Ontario (CA), M5H 3R8

(73) Assignees: Peter W. E. Smith, Toronto (CA); David Cooper, Toronto (CA)

(*) Notice: Subject to any disclaimer, the term of this patent is extended or adjusted under 35 U.S.C. 154(b) by 178 days.

(21) Appl. No.: 09/824,582

(22) Filed: Apr. 3, 2001

(65) Prior Publication Data

US 2002/0025097 A1 Feb. 28, 2002

Related U.S. Application Data

(63) Continuation-in-part of application No. 09/413,800, filed on Oct. 7, 1999, now Pat. No. 6,212,306.

(51) Int. Cl.[7] ............................. G02B 6/00; G01B 11/16
(52) U.S. Cl. ...................... 385/12; 385/37; 250/227.19; 356/478
(58) Field of Search ................. 385/12, 37; 250/227.18, 250/227.19, 227.23; 356/477, 478, 35.5

(56) References Cited

U.S. PATENT DOCUMENTS

| | | | |
|---|---|---|---|
| 4,996,419 A | 2/1991 | Morey | |
| 5,680,489 A | 10/1997 | Kersey | |
| 5,684,297 A | 11/1997 | Tardy | |
| 5,757,487 A | 5/1998 | Kersey | |
| 5,987,197 A | 11/1999 | Kersey | |
| 6,072,567 A | 6/2000 | Sapack | |
| 6,201,912 B1 * | 3/2001 | Kempen et al. | 385/37 |
| 6,233,373 B1 * | 5/2001 | Askins et al. | 385/12 |
| 6,285,806 B1 * | 9/2001 | Kersey et al. | 385/12 |
| 2001/0048071 A1 * | 12/2001 | Holz et al. | 250/227.12 |

OTHER PUBLICATIONS

Fiber Grating Sensors, Journal of Lightwave Technology, vol. 15., No. 8 Aug. 1997, pp. 1442–1462.
Fiber Optic Bragg Grating Sensors, SPIE, vol. 1169, Fiber Optic and Laser Sensors VII (1989) pp. 98–107.
Narrow–Band Bragg Reflectors in Optical Fibers, Optics Letters, vol. 3 No. 2, Aug. 1978, pp. 66–68.

* cited by examiner

*Primary Examiner*—Hemang Sanghavi
(74) *Attorney, Agent, or Firm*—Lynn C. Schumacher; Hill & Schumacher

(57) ABSTRACT

The present invention provides a method and devices for time division multiplexing of a fiber optic serial Bragg grating sensor array containing more than one Bragg grating. The device provides a pulse read-out system that allows for a reduction in system noise and an increase in sensor resolution and flexibility. In one aspect the optical signals reflected from the Bragg grating sensor array are gated by an electronically controlled optical modulator before any wavelength measurement is performed to determine the sensor information. This offers significant advantages since the sensor information is encoded into the wavelength of the optical signal and not its intensity. Therefore the sensor signal information is not distorted by the gating. Since the gating or switching of the optical modulator is performed on the optical signal, the speed of the electronic processing needs only to be performed at the speed of variation of the sensor information and the choice of methods of wavelength measurement is not influenced by the gating action. The device may include one or more optical amplifiers that provide the ability to demultiplex the reflected signals electronically.

61 Claims, 13 Drawing Sheets

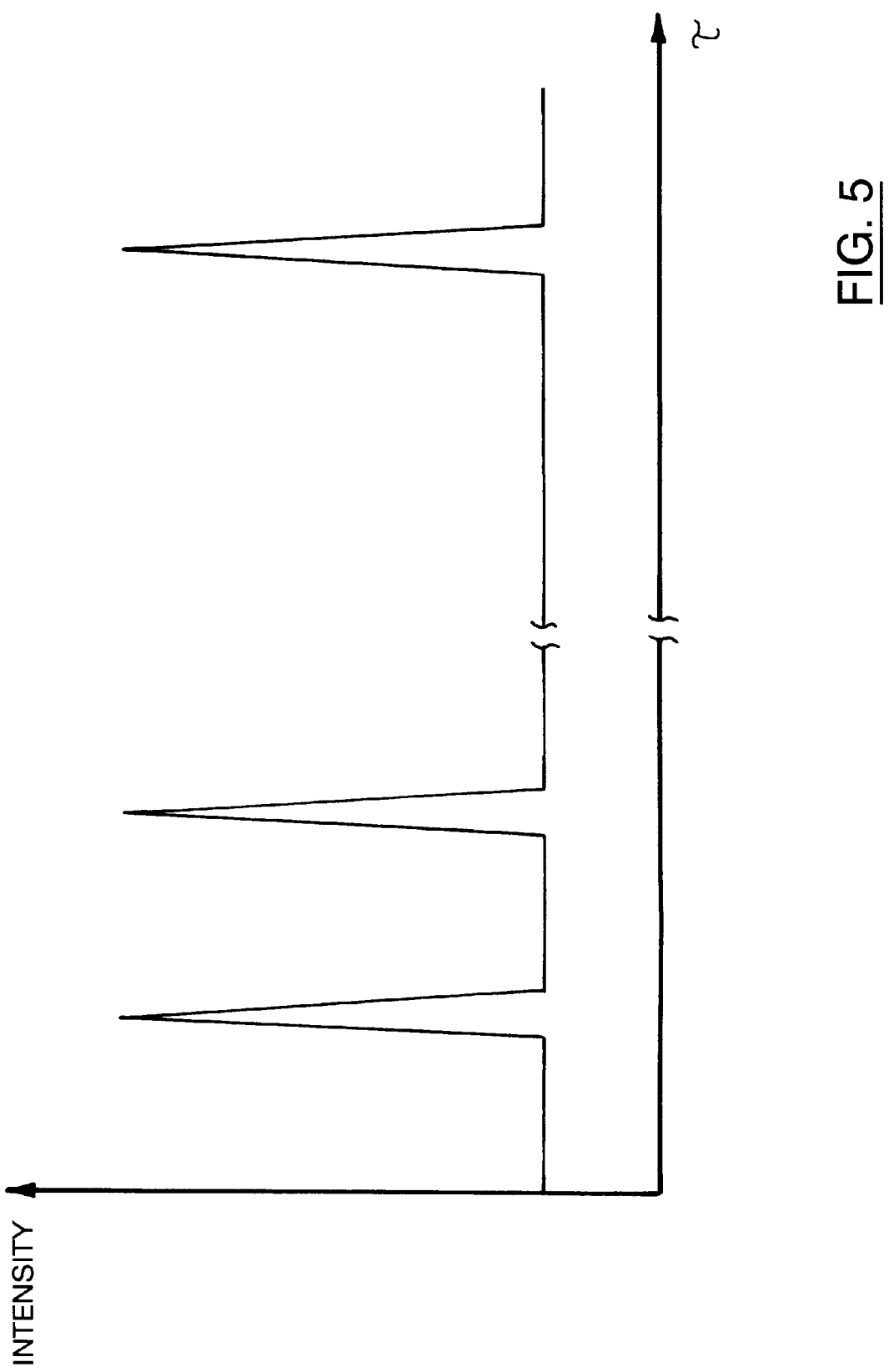

METHOD AND DEVICES FOR TIME DOMAIN DEMULTIPLEXING OF SERIAL FIBER BRAGG GRATING SENSOR ARRAYS

CROSS REFERENCE TO RELATED APPLICATION

This patent application is a continuation-in-part application of U.S. patent application Ser. No. 09/413,800 filed on Oct. 7, 1999 now U.S. Pat. No. 6,212,306, entitled METHOD AND DEVICE FOR TIME DOMAIN DEMULTIPLEXING OF SERIAL FIBER BRAGG GRATING SENSOR ARRAYS which has now been allowed.

FIELD OF THE INVENTION

The present invention relates to a method and devices for optical demultiplexing multiple Bragg gratings in a Bragg sensor array.

BACKGROUND OF THE INVENTION

Fiber optic Bragg gratings may be used as sensors to monitor perturbations in their environment. A Bragg grating is formed in a single mode optical fiber by creating a periodic refractive index perturbation in the fiber core as described by Kawaski, Hill, Johnson and Fuhjii in Optics Letters, Vol. 3, pp. 66–68, 1978. The diffraction grating in the fiber core will reflect optical frequencies within a narrow bandwidth around the Bragg wavelength of the optical grating. The Bragg wavelength of the diffraction grating can be altered by changing the grating pitch. If an external influence alters the grating pitch then the reflection spectrum of the grating can be monitored to determine the magnitude of the external influence. If the grating is subject to varying strain or temperature, the pitch of the grating is altered as described by Morey, Meltz and Glenn in the Proceeding of the IEEE, vol. 1169, pp. 98–107, 1989. By coupling the grating to an appropriate transducer, the grating can be used to monitor a wide variety of parameters including but not limited to strain, temperature, vibration, pressure, and acceleration.

Fiber optic Bragg grating sensors offer many advantages over traditional electrical sensors for monitoring the various parameters. They provide inherent immunity to electromagnetic interference and provide a reliable signal with very little noise. They can also withstand large variations in temperature and pressure and are compact in size allowing them to be used in locations where conventional sensors are impractical. Bragg grating fiber sensors have the additional advantage that the signal is encoded directly into an absolute wavelength shift of the optical signal, so the signal is insensitive to optical power fluctuations and other signal perturbations.

Unfortunately, the design of Bragg grating sensor systems is often more costly than the conventional electrical sensor alternatives and this has prevented their widespread adoption in many applications. To increase the utility of Bragg grating sensors, it would be advantageous to be able to multiplex many grating sensors in the same optical fiber in order share expensive resources such as the optical source and the sensor measurement unit among the many sensors thereby dramatically reducing the cost per sensor. The placement of many sensors in the same fiber often simplifies the installation of the sensors in structures or systems by reducing bulk and complexity. It is also desirable that the functionality and performance of the system not be degraded by the multiplexing technique.

These potential advantages have motivated significant efforts into developing methods of multiplexing Bragg grating sensors. It would be very beneficial to be able to multiplex a hundred sensors or more in a single optical fiber using only one light source and spectral measurement system. Current systems have fallen short of this goal with about ten sensors per fiber in demonstrated systems that do not severely restrict the sensor's application. As the number of sensors grows there is an increased demand on the optical source power and the complexity of the multiplexing and/or demultiplexing. For a very large number of sensors the cross talk between the sensors can become a significant problem.

Many different multiplexing techniques have been developed for Bragg grating sensors. The most successful techniques for use with a large number of sensors have been wavelength division and time division multiplexing. Examples of these systems are described in the paper by Kersey et al. in the Journal of Lightwave Technology vol. 15, pp.1442–1462, 1997.

In wavelength division multiplexing, the Bragg wavelength of each sensor is set at a separate and unique wavelength. The separations of the Bragg wavelengths are made to be far enough apart so that any reasonable external influence to the grating sensors will not be sufficient to cause the Bragg wavelengths of any two sensors to overlap. Thus each sensor is given a unique wavelength band or slot for its Bragg wavelength. In many situations, the size of each wavelength slot may need to be very large. This requirement can result from the necessity to be able to detect a large range of the parameter being sensed or due to the fact there may be uncertainty in the nominal Bragg wavelength of the sensors. Uncertainty may arise from variations in the fabrication process of the gratings, by static strains or uncertain operating temperatures when the sensor is used. The variability can necessitate a wavelength slot for each sensor in excess of 15 nm for Bragg wavelengths near 1550 nm. When the number of multiplexed sensors is large, the bandwidth requirement on the optical source can become intractable thus limiting wavelength division multiplexing to well controlled sensors that are subject to small external influences.

To overcome the aforementioned problems associated with limited optical bandwidth, the Bragg wavelengths of the sensors may be fabricated with nearly identical Bragg wavelengths and multiplexed with time division multiplexing. In this method a short optical pulse is sent along the fiber containing the Bragg sensors. The pulse will partially reflect off of each sensor and return the sensor information from each grating. The signals from each sensor can be distinguished by their time of arrival. Previous demonstrations of time division multiplexing have determined the time of arrival of the signal by converting the optical pulses into an electrical signal and then gating the electrical signal with a known time delay. Only the pulse that is passing through the electronic detector at the time of the gate is measured. By varying the time delay of the gate, the signals from each of the sensors can be read out.

A previous method used in the art to identify the sensor signals is to electrically gate the sensor signals as disclosed in U.S. Pat. No. 5,680,489. Since the sensors are now identified by time discrimination instead of wavelength, bandwidth requirements of the source will not limit the number of sensors. However, different problems can be encountered in time division multiplexing that can limit the performance of the system. Time division multiplexed systems generally experience more noise than wavelength division multiplexed systems. A significant contribution of the noise is from multiple reflection between the different grating sensors that cause a pulse to arrive back from the sensor array at a time later than expected. Noise is also be contributed by the optical source which may not be pulsed in an ideal manner so that there is a finite level of optical power between successive pulses.

Bragg grating sensor systems often require a very high dynamic range of eighty to a hundred and twenty decibels. Therefore any small sources of noise can be significant. To optimize the performance of the system it is necessary to perform the signal gating in as short a time period as possible. This allows the system to reject a large portion of the noise that does not return at the same time as a sensor pulse. With the method of gating used previously in the art, the performance of the system is limited. An electronic circuit performs the gating action after an optical detector has detected the optical signal. Therefore the electronic circuit must be operated at the speed of arrival of the optical pulses. It is difficult to operate electronic circuits at very high speed and still maintain very high signal fidelity due to noise and distortion. Since the gating is done after the optical signal is detected, the wavelength measurement on the signals must be done before the gating. Therefore any noise or distortions in the gating process will create errors in the sensor signal. Furthermore, the limited operation of this gating method will reduce the spatial resolution of the sensor system since the pulses from the sensor array must be spaced far apart in time.

It would therefore be very advantageous to provide a method and apparatus for time division optical multiplexing multiple serial Bragg gratings which reduces noise associated with the gating process and allows for very fast gating times.

SUMMARY OF INVENTION

It is an object of the present invention to provide methods and devices to facilitate demultiplexing two or more Bragg gratings in a sensor array that can all share the same optical source and wavelength detection unit.

In one aspect of the present invention there is provided a pulse read-out system to implement time division multiplexing of a fiber optic Bragg grating sensor array. The pulse read-out system allows for a reduction in system noise and an increase in sensor resolution and flexibility. A basic idea of the present invention is that the optical signal from the grating sensors is either gated by an electronically controlled optical modulator before any wavelength measurement is performed to determine the sensor information or the optical pulses from the light source.

This offers significant advantages since the sensor information is encoded into the wavelength of the optical signal and not its intensity. Therefore the sensor signal information is not distorted by the gating. Since the gating is performed on the optical signal, the speed of the electronic processing needs only to be performed at the speed of variation of the sensor information and the choice of methods of wavelength measurement is not influenced by the gating action.

The gating or switching action of the optical modulator will modify the optical power transmitted to the sensor information-processing portion of the system, but will not modify the spectral content of the optical signal. Therefore distortion and noise in the gating signal will not alter the sensor reading thus providing a more robust readout system. This allows the system to operate at very short gating times and provides a measure of immunity from unwanted signals returning from the sensor array and provides superior sensor spatial resolution. Additionally, the optical signals in the sensor system may be optically amplified before being directed to the optical modulator.

Alternatively, optical signals reflected from the Bragg grating sensor array may be optically amplified and directed to a wavelength detector having an electronic gating circuit connected to the wavelength detector for gating signals produced by the wavelength detector for selectively analysing optical signals reflected from a preselected Bragg grating in said Bragg sensor array.

The presence of the optical amplifier(s) provides a significant benefit for this configuration since it allows the signal to be amplified to a higher power such that the noise level introduced by the electronic gating process is insignificant. This is particularly important since the operation of an electronic gating circuit at the speeds required for an effective multiplexed sensor system will typically introduce a noise level that would degrade the measurement ability of a conventional unamplified sensor system.

The present invention provides a means for evaluating the sensor configuration of the network to high degree of precision if it is not known beforehand. A means is also provided to implement synchronous detection of the sensor signal in combination with the gating action of the optical signal.

An additional advantage of the present method is its flexibility with sensor signal decoding techniques. Depending on the application of the sensors, different demands may be required of the system. For example, one may want to measure rapidly varying signals or quasi-static signals. One may require a large dynamic range or a large sensing range. Many different techniques of decoding the sensor information of Bragg gratings have been developed but all of them must measure the wavelength of the returned signal. Therefore the present sensor read-out technique can be easily integrated with a wide variety of sensor measurement methods since the optical gating does not alter the wavelength information of the optical signal.

In one aspect of the present invention there is provided a Bragg grating sensor device, comprising:
a) a broadband light source adapted to produce optical pulses;
b) a Bragg sensor array including at least two spaced apart Bragg gratings located in an optical waveguide, said Bragg sensor array being optically coupled to said light source; and
c) an optical modulator optically coupled to said Bragg sensor array for receiving optical signals reflected from said Bragg sensor array, wavelength detection means optically coupled to said optical modulator for analysing wavelength content of said optical signals, adjustable gating means connected to said optical modulator for gating said optical modulator for selectively transmitting optical signals reflected from a preselected Bragg grating in said Bragg sensor array to said wavelength detection means.

In this aspect of the invention the device may include an optical amplifier located between either the light source and the Bragg sensor array or between the Bragg sensor array and the optical modulator.

In another aspect of the present invention there is provided a Bragg grating sensor device, comprising:
a) a broadband light source adapted to produce optical pulses;
b) a Bragg sensor array including at least two spaced apart Bragg gratings located in an optical waveguide, said Bragg sensor array being optically coupled to said light source;

c) wavelength detection means optically coupled to said Bragg sensor array for analysing wavelength content of said optical signals reflected from said Bragg sensor array;

d) at least one optical amplifier optically coupled either between said light source and said Bragg sensor array or between said Bragg sensor array and said wavelength detection means; and e) electronic gating means connected to said wavelength detection means for gating signals produced by said wavelength detection means for selectively analysing optical signals reflected from a preselected Bragg grating in said Bragg sensor array.

The present invention also provides a method for time domain demultiplexing a serial fiber Bragg grating array comprising at least two Bragg gratings spaced apart from each other in a sensor network, comprising;

directing optical pulses from a broadband light along said sensor network toward said Bragg grating array; and gating optical signals reflected by said Bragg sensor array to preselect optical signals reflected from a selected Bragg grating, said optical signals being gated using a gated optical modulator, and spectrally analyzing said preselected optical signals to determine a wavelength content of said reflected optical signals.

In another aspect of the invention there is provided a method for time domain demultiplexing a serial fiber Bragg grating array comprising at least two Bragg gratings spaced apart from each other in a sensor network, comprising;

directing optical pulses from a broadband light along said sensor network toward said Bragg grating array;

amplifying one of said light pulses from said broadband light source and optical signals reflected from said Bragg sensor array; and detecting optical signals reflected by said Bragg sensor array by a wavelength detection means and gating signals produced by said wavelength detection means to preselect optical signals reflected from a selected Bragg grating, and spectrally analyzing said preselected optical to determine a wavelength content of said reflected optical signals.

BRIEF DESCRIPTION OF THE DRAWINGS

The method and apparatus for time division optical demultiplexing Bragg gratings in optical fibers will now be described, by way of example only, reference being had to the accompanying drawings, in which:

FIG. 5 illustrates a method of determining the configuration of the sensors;

DETAILED DESCRIPTION OF THE INVENTION

Figure 1:
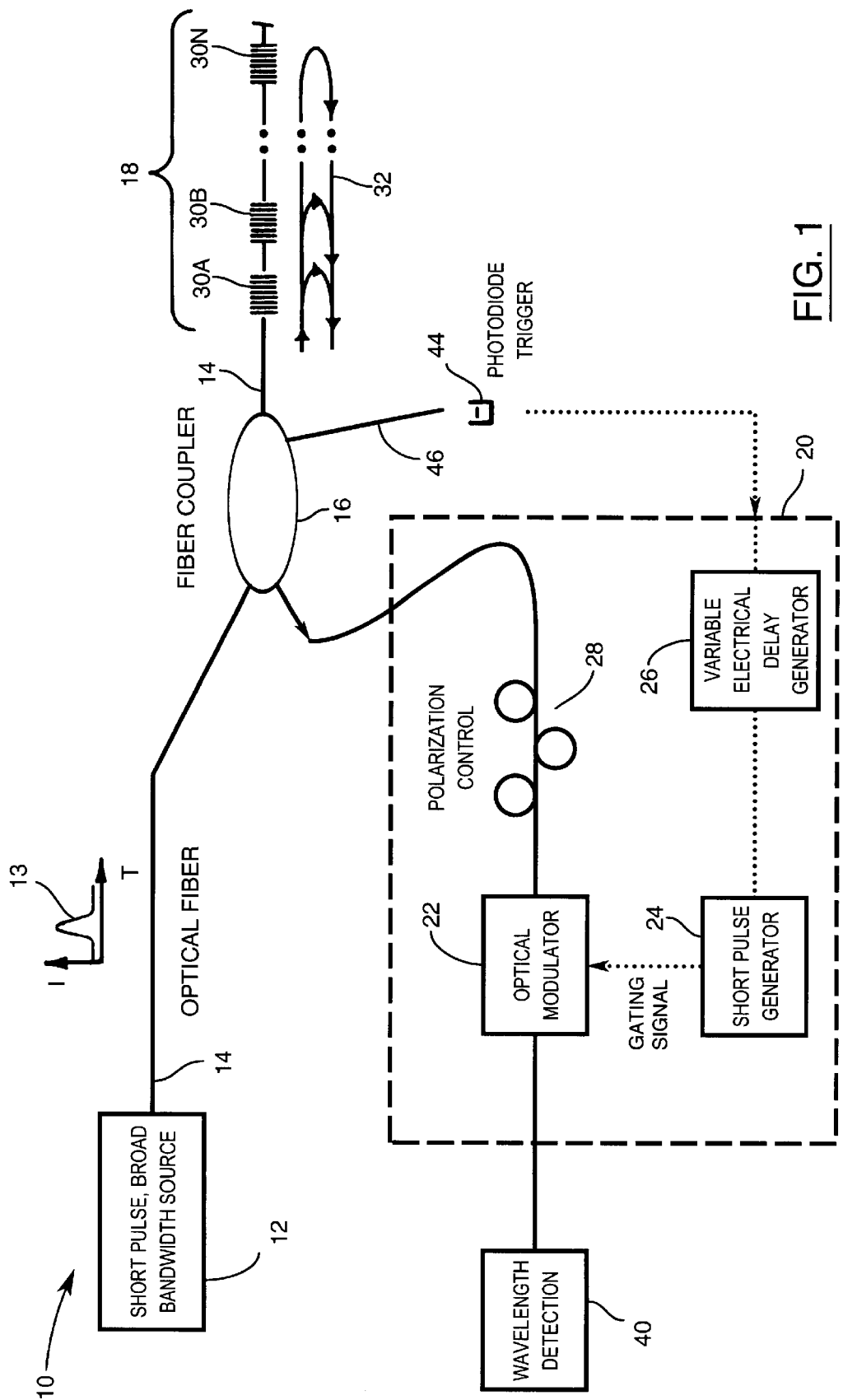
FIG. 1 is a block diagram of a system for time division optical demultiplexing of multiple Bragg gratings in an optical fiber.

Referring first to FIG. 1, an apparatus used for time division optical demultiplexing multiple Bragg gratings in optical fibers is shown generally at 10. A light source 12 launches optical pulses 13 into a optical fiber 14 containing a fiber splitter 16 and a serial array of Bragg grating sensors 18 located on the other side of splitter 16 from source 12. The optical fiber used is preferably a single mode silica optical fiber however any other optical fiber or waveguide in which a Bragg grating can be written may be used. Each sensor in sensor array 18 will return an optical pulse with wavelength encoded information, producing a train of pulses that are directed towards an optical demultiplexing system 20. The sensors in array 18 are coupled to one or more external parameters that they are to monitor so that changes in these parameters will modify the Bragg wavelength of the sensors. The coupling may be achieved by embedding or bonding the fiber sensors 18 to the structure or apparatus to be monitored so that changes in temperature or strain are also experienced by the sensors. The sensors may also be coupled to an appropriate transducer known in the art to convert other parameters into a shift in the sensor's Bragg wavelength. The optical fiber near the sensors has the protective buffer removed to permit the sensors to be directly coupled to the appropriate structure, apparatus or transducer.

The optical demultiplexing system 20 is essentially an optical transmission device that can be rapidly switched between a transmission state in which light is transmitted through it and an attenuation state in which light is attenuated. The optical transmission device includes an optical modulator 22, a preferred optical modulator is a commercial lithium niobate opto-electronic modulator that is gated (switched) using a switching mechanism comprising an electrical signal from a short pulse generator 24 so that light is only allowed to pass through the modulator 22 to a wavelength detection system 40 when the gating voltage signal is applied. The switch also includes a variable electrical delay generator 24 connected to the short pulse generator 24. By varying the time delay of the gating signal using the variable electrical delay generator 24, the individual reflected optical pulses transmitted through the modulator to the wavelength detection system are selected. The optical demultiplexing system 20 may include a polarization control 28. The polarization control is useful for adjusting the polarization of the sensor signals to a preferred polarization state if the optical modulator 22 is sensitive to the polarization of the optical signal. The polarization control may be performed by inducing birefringence into the optical fiber after the fiber splitter 16 or by other methods known in the art.

Figure 2:
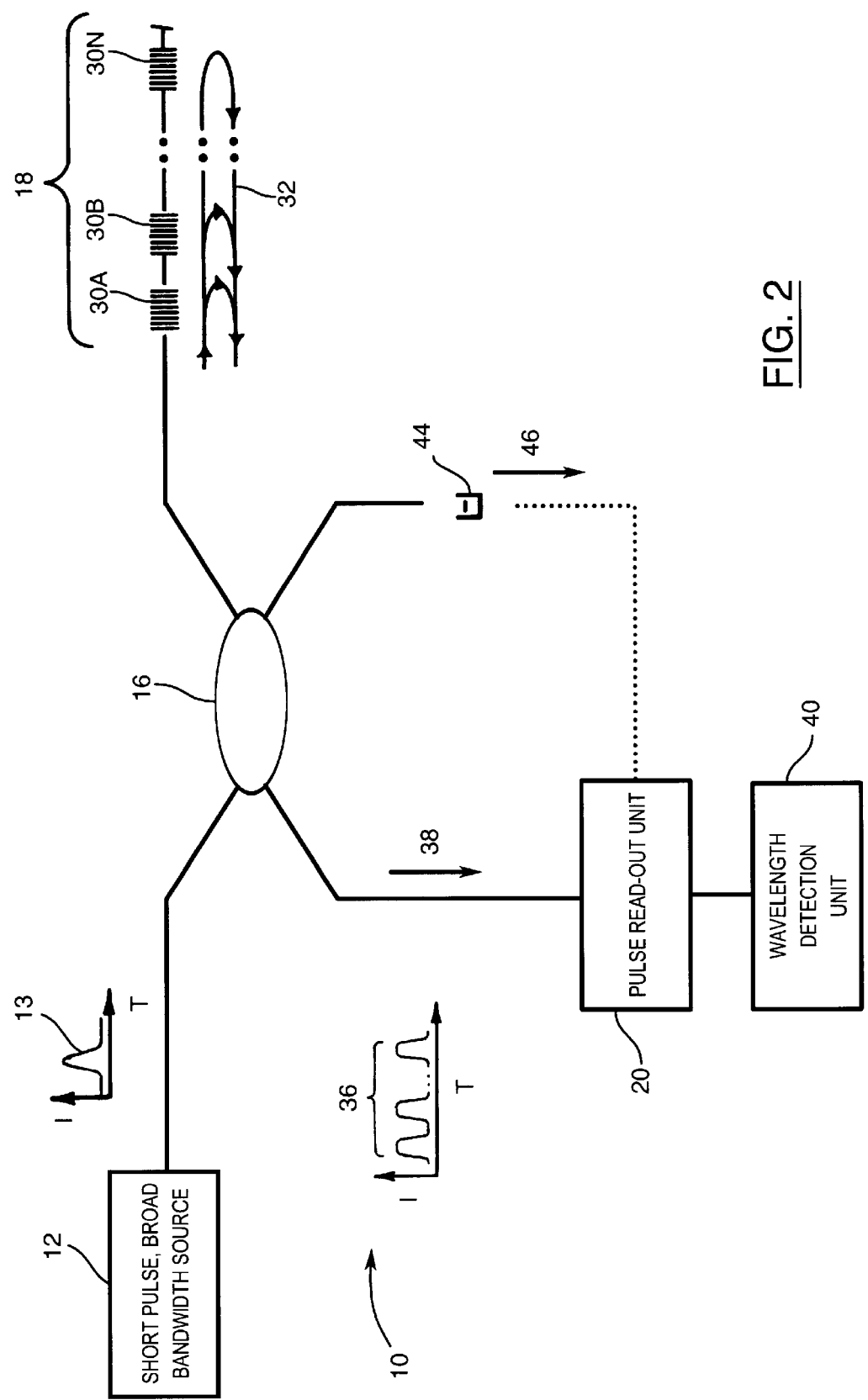
FIG. 2 is a block diagram of a pulsed read-out system forming part of a time-division multiplexed fiber optic Bragg grating sensor array.

Referring to FIG. 2, Bragg grating sensor array 18 includes several Bragg gratings 30A, 30B . . . 30N are written at separate locations in the single mode optical fiber 14. Optical pulse 13 from light source 12 (containing sufficient optical bandwidth to cover the expected range of Bragg wavelengths of any given Bragg grating sensor in array 18) is launched into the serial sensor array 18 through the optical coupler 16. The Bragg grating sensors 30 are each fabricated to be reflective within the bandwidth of the optical source and wavelength measurement capability of the system for any reasonable perturbations of the sensors.

The reflectivity of each Bragg grating sensor in array 18 at each of their respective Bragg wavelengths is designed to be a few percent or less so that only a small portion of the pulse 13 launched into the array is back-reflected at each sensor. The rest of the optical pulse is allowed to propagate to sensors further down the array 18 and be likewise reflected. The arrows 32 indicate the possible paths of the optical signal. Thus, from the single optical pulse 13 launched into the sensor array 18, a train of pulses 36 are returned from the sensor array through the fiber path 38 after passing through coupler 16. Each returned pulse has a spectral content corresponding to the spectral reflectivity of the Bragg grating sensor that it originated from. In general the duration of the pulses must be shorter than the duration of the optical gate and the repetition rate must be lower than the time for the pulse to traverse the fiber and return to the pulse read-out system.

The minimum physical spacing of the Bragg sensors in the array 18 is given by the temporal duration of the optical gate. The time for the optical pulse to travel twice the distance between the two nearest sensors must be longer than the gating time. The maximum number of sensors is limited to the ratio of the total physical length of the sensor array, from the first sensor to the last, to the minimum physical spacing between sensors. The maximum number can also be expressed as the ratio of twice the time for an optical pulse to travel from the first sensor to last, to the temporal duration of the optical gate.

In a preferred embodiment the pulses from the source are made to be shorter in duration than the time for a pulse to travel twice the distance between the two spatially closest sensors on the sensor array. In this preferred embodiment a mode-locked fiber laser producing sub-picosecond pulses with a bandwidth >10 nm may be used. However those skilled in the art will understand that other light sources may be used as long as they meet the requirements described above. Each of the individual pulses making up pulse train 36 from the sensor array 18 will return from the sensor array at unique times. The pulses containing the sensor information in the optical fiber branch 38 are directed towards the pulse read-out system 20. The optical source 10 launches a series of pulses at a fixed repetition rate into the sensor array to repeat the process described above. The period between pulses is greater than the time for a pulse to travel twice the distance from the first sensor to the last sensor in the array.

The sensor information contained within each pulse of pulse train 36 may be identified as coming from the appropriate Bragg grating sensor by the time of arrival of the pulse at the pulse read-out unit 20. The pulse read-out unit 20 allows the optical signal to propagate to the wavelength detection unit 40 for a short period of time and acts as an optical gate on the returned optical signal. The duration of the optical gate is chosen to be longer than the temporal duration of the pulse response from any one Bragg grating and shorter than the time between two pulses arriving from spatially adjacent Bragg grating sensors of array 18.

The timing of the optical modulator is determined by a timing signal derived from the pulses from the optical source 12. The timing signal may be generated by the optical detector 44 and passed to the pulse read out unit 20 through path 46. The signal may also be generated directly at the optical source 12. For example, if the optical source 12 is pulsed directly using an electrical control signal, then this signal may be used for timing by the pulse read-out unit 20.

The timing signal is delayed in the pulse read-out unit 20 and used to trigger the optical gate. The delay is chosen so that only one pulse is allowed to pass through the optical gate for each pulse of pulse train 36 returning from the sensor array 18. Thus, only the signal from one Bragg grating sensor will reach the wavelength detection unit 40, and the wavelength detection can be performed as if only one Bragg grating sensor was being monitored. The wavelength detection unit 40 may be of any standard design that is suitable for measuring the sensor signal and interrogation of the optical pulse may be performed using techniques known in the art.

Figure 3:
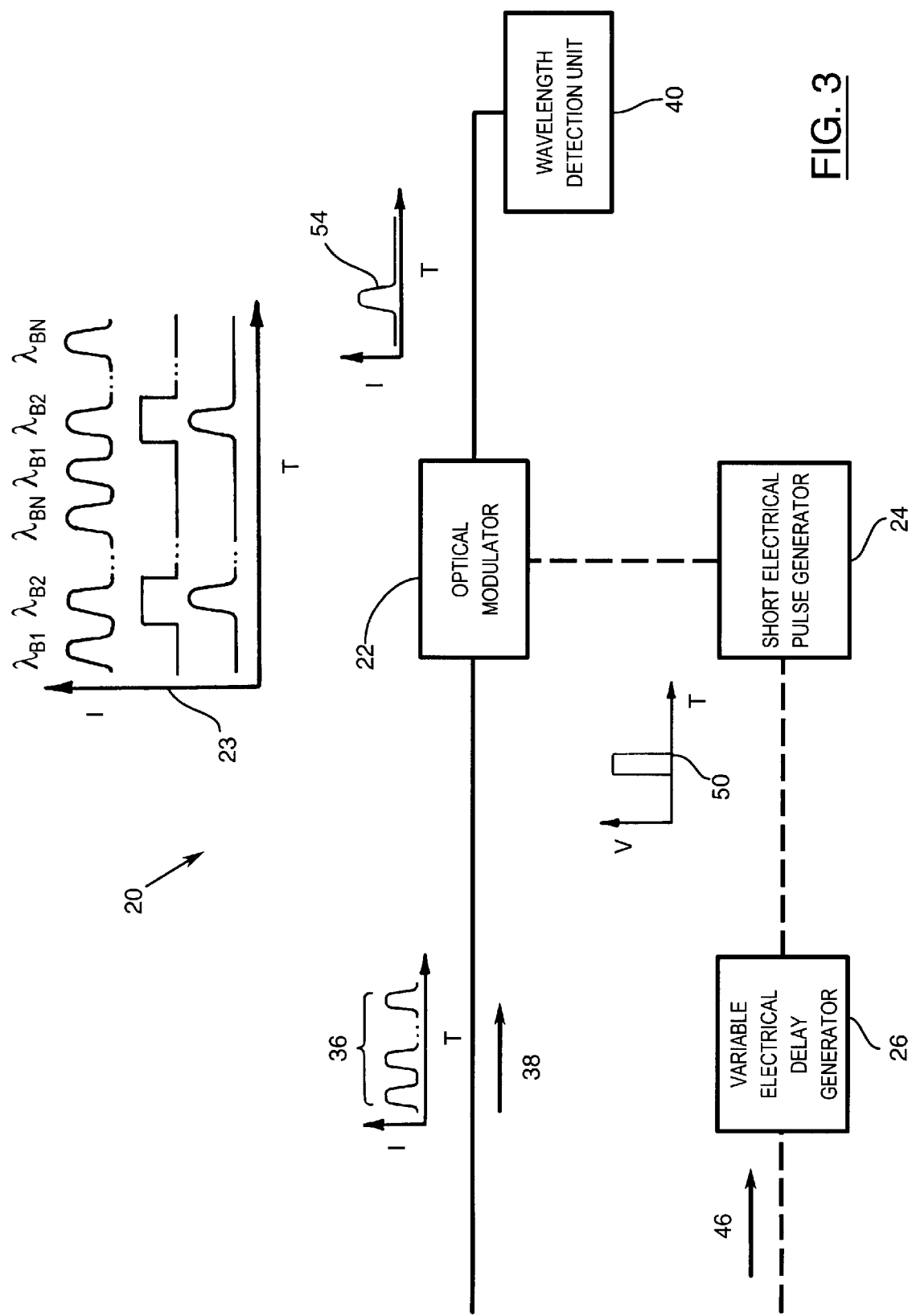
FIG. 3 is a more detailed block diagram of the pulsed read-out unit of FIG. 2.

The operation of the pulse read-out unit 20 is more closely detailed in FIG. 3. The pulse read-out unit 20 includes electronic delay generator 26 connected to short electrical pulse generator 24 which is connected to electro-optical modulator 22 that modifies the transmission of light in accordance with the electrical signal applied to it.

The train of pulses 36 along path 38 of the fiber is shown at the input to the optical modulator 22 in FIG. 3. Each individual pulse has a central wavelength, denoted by $\lambda_{B1}$, $\lambda_{B2}$ . . . $\lambda_{Bn}$ corresponding to the Bragg grating wavelength of the sensor from which the pulse originates. By choosing a suitable delay of the trigger pulse with the electrical delay generator 26, the short pulse generator can be triggered to produce an electrical pulse to the electro-optical modulator 22 when one of the pulses, for example the pulse containing $\lambda_{B2}$, is passing through the modulator. The gating of the optical pulses is demonstrated graphically by 23. The top set of pulses in 23 shows the progression in time of the set of pulses 36. The gating action of the modulator is shown below these pulses. The gating is synchronized with the pulses containing $\lambda_{B2}$. Below the gating pulses, the selected optical pulses are shown containing only $\lambda_{B2}$. The short pulse generator 24 produces a very short electrical pulse that is wider than the temporal width of the pulse to be gated. It is found that if the pulse from the optical source 12 is several picoseconds or less in temporal duration, then the reflected pulses typically have a temporal width of fifty to a hundred picoseconds. The temporal gate width of the optical modulator 22 should be slightly larger than the width of the pulse, however the lower limit may be restricted by the dynamic response of the modulator or the speed of the electrical pulse generator 24 that produces the gating signal 50. Typical gating times may be from five hundred to a thousand picoseconds. The optical modulator 22 can be implemented, among other methods known in the art, by a Mach-Zehnder integrated optic modulator that is controlled through the electro-optic effect or by a semiconductor electro-absorption modulator.

The process described above is repeated at the repetition rate of the optical source 12 so that only the pulse from one Bragg grating sensor is allowed to pass through the modulator 22 for each pulse launched into the system. This is shown in FIG. 3 by the single pulse 54 that exits from the modulator 22 for the train of pulses incident on the modulator 22. A train of pulses will then arrive at the wavelength detection unit 40 at the repetition rate of the optical source 12. This repetition rate is made to be greater than the electrical bandwidth of the wavelength detection unit 40. The lower bandwidth of the detection electronics will make the train of pulses appear as a continuous signal that varies at the rate of perturbations to the Bragg grating sensors. The average level of detected signal is given by the average optical power from the pulse read-out unit. In this way, the wavelength detection unit effectively is decoding a sensor signal as if there was only one sensor in the system. Thus, any one of the numerous methods known in the art for signal decoding a single Bragg grating sensor may be used.

Different sensors may be monitored by altering the pulse 54 that is selected by the pulse read-out unit from the train of pulses 36 corresponding to each Bragg grating sensor in array 18. This selection is achieved by altering the delay in the electrical delay generator 26 so the gating pulse 50 is applied to the optical modulator 22 when the desired pulse passes through the modulator.

The gating pulse 50 is made to be slightly longer than the optical pulses returning from the sensors. The time between pulses from the optical source will typically be much longer then the gating time. For example if the length of the sensor array 18 is made to be a hundred meters and the gating time was 1 nanosecond, then the optical gate would be open 0.1% of the time. This enables the sensor system to reject a large portion of unwanted signals from sensor array 18. Such unwanted signals include multiple reflections between grating sensors, reflections from fiber splices and other components and noise from the optical source that may be caused by a small continuous light output in addition to the pulsed output. In this way, the pulse read-out system 20 helps to reject erroneous signals from the sensor array 18.

It is to be noted that electrical noise in the gating pulse 50 does not affect the sensor reading. Variations in the gating pulse amplitude will cause variations in the optical signal at the output of the pulse read-out unit 20, but will not affect the spectral content of the optical signal. Therefore the sensor information can still be recovered despite imperfections in the high speed gating pulse.

Figure 4C:
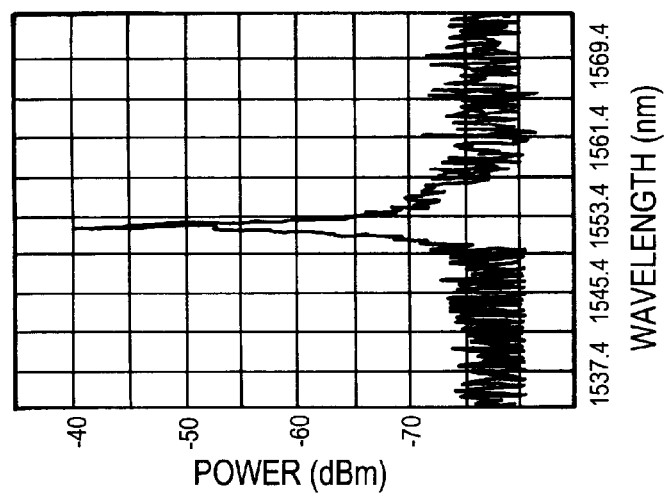
FIG. 4C is similar to FIG. 4B but using a differently delayed gating pulse so that only the optical spectrum from the second Bragg grating sensor in the sensor array is detected.
Figure 4B:
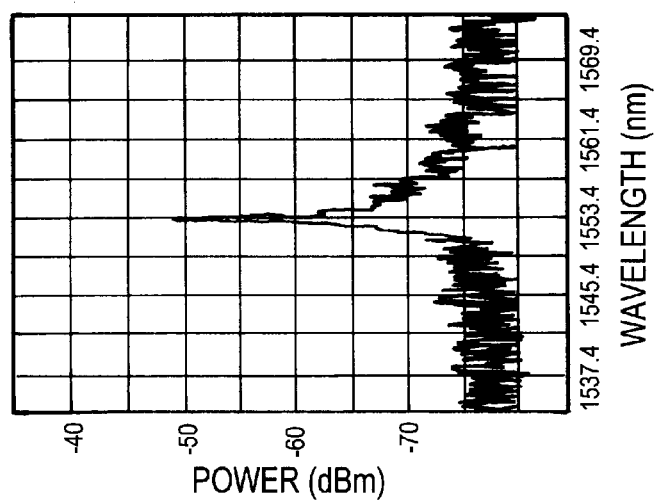
FIG. 4B shows the optical spectrum of the sensor array of FIG. 4A using a pulsed readout system using a delay of a gating pulse so that only the optical spectrum from the first Bragg grating sensor in the sensor array is detected.
Figure 4A:
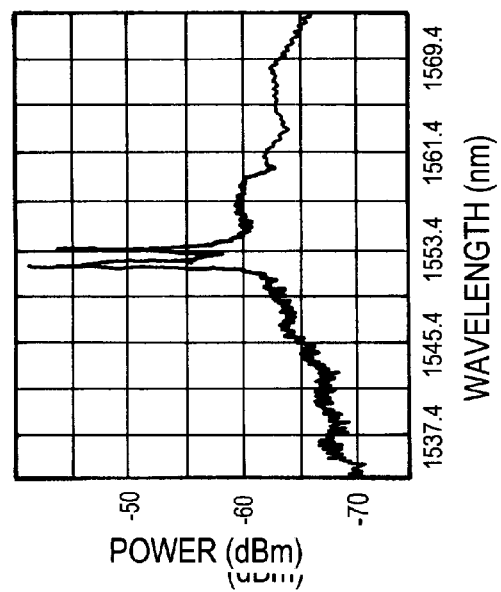
FIG. 4A shows the optical spectrum of a sensor array having two multiplexed Bragg gratings without use of time division demultiplexing.

FIG. 4 shows the result of the operation of the pulsed read-out unit with a time multiplexed sensor array using two Bragg grating sensors. These figures show the optical spectrum from the sensor array as obtained on a standard optical spectrum analyzer. The optical spectrum from the sensor array without the pulse read-out system is shown in FIG. 4A. In FIG. 4A there are clearly two peaks corresponding to the reflection from the two sensors and some background optical signal. With the use of the pulse read-out system only the optical spectrum from the first Bragg grating sensor in the sensor array is seen at the spectrum analyzer as shown in FIG. 4B. In FIG. 4C the delay of the gating pulse is set so that the spectrum analyzer only measures the spectrum from the second Bragg grating sensor. The pulse read-out unit allows one to identify and isolate the sensor information from each of the Bragg grating sensors.

FIG. 5 illustrates a method of using the pulse read-out unit to identify each of the sensor gratings to determine their location in the sensor array and to choose the correct delay to read-out each sensor. An arbitrary starting delay is chosen for the delay generator 26 of FIG. 3. The value of the delay, denoted by the $\tau$ axis of FIG. 5 is swept from the starting point given by $\tau$ equal to zero to the time for one repetition of the optical source. The optical power at the output of the optical modulator 22 in FIG. 3 versus the delay $\tau$ reveals the pulse response of the sensor array. By calibrating the distance along the sensing fiber that the optical signal will travel for a given delay $\tau$, the physical location of each sensor may be determined. Therefore the gratings may be placed in the sensor without detailed knowledge of their positions. By determining the positions of each sensor, and by calculating their Bragg wavelengths, the effects of cross talk due to multiple reflections may also be reduced since the occurrences of multiple reflections can be predicted if the configuration and state of the sensor array is known.

Figure 6:
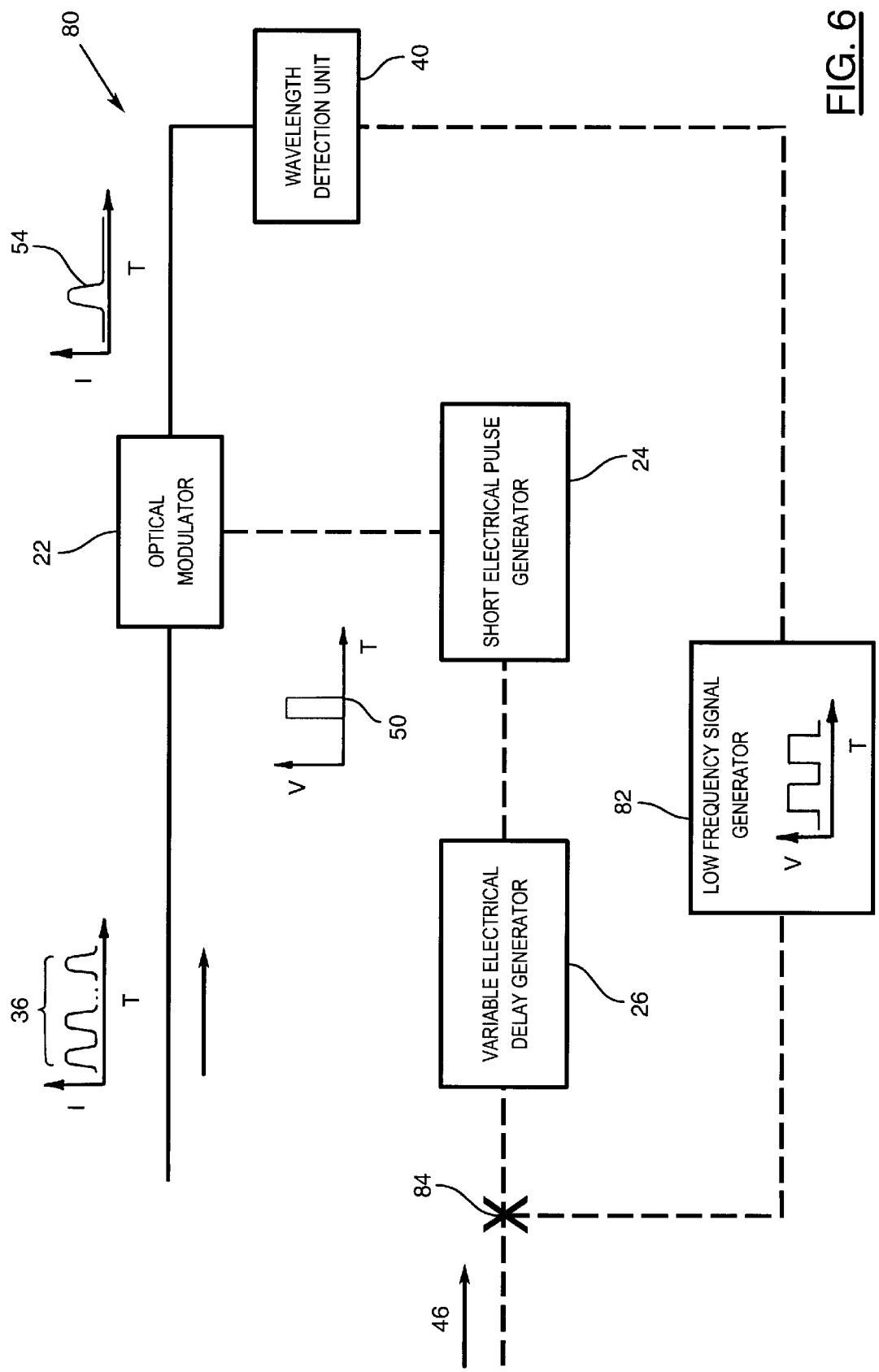
FIG. 6 is a second embodiment of the invention to implement synchronous detection.

An alternative embodiment of the invention is shown at 80 in FIG. 6. The operation of the pulse read-out system 80 in FIG. 6 is similar to the system 20 of FIG. 3 except a low frequency modulating signal 82 is multiplied with the timing signal to the modulator at junction 84. This junction 84 may be placed before the delay generator 26 as shown or between the delay generator 26 and the pulse generator 24 (not shown). The modulating signal 82 alternately turns the timing signal on and off at a rate of a few kilohertz. This allows the output from the pulse read-out unit 80 to be modulated at the same rate. The modulation signal 82 is also passed to the wavelength detection unit for reference. The modulation allows for synchronous detection to be used in measuring the sensor signal. Synchronous detection permits the system to obtain higher sensitivity by rejecting noise such as the dark current from optical detectors and noise in electrical amplifiers.

Figure 7:
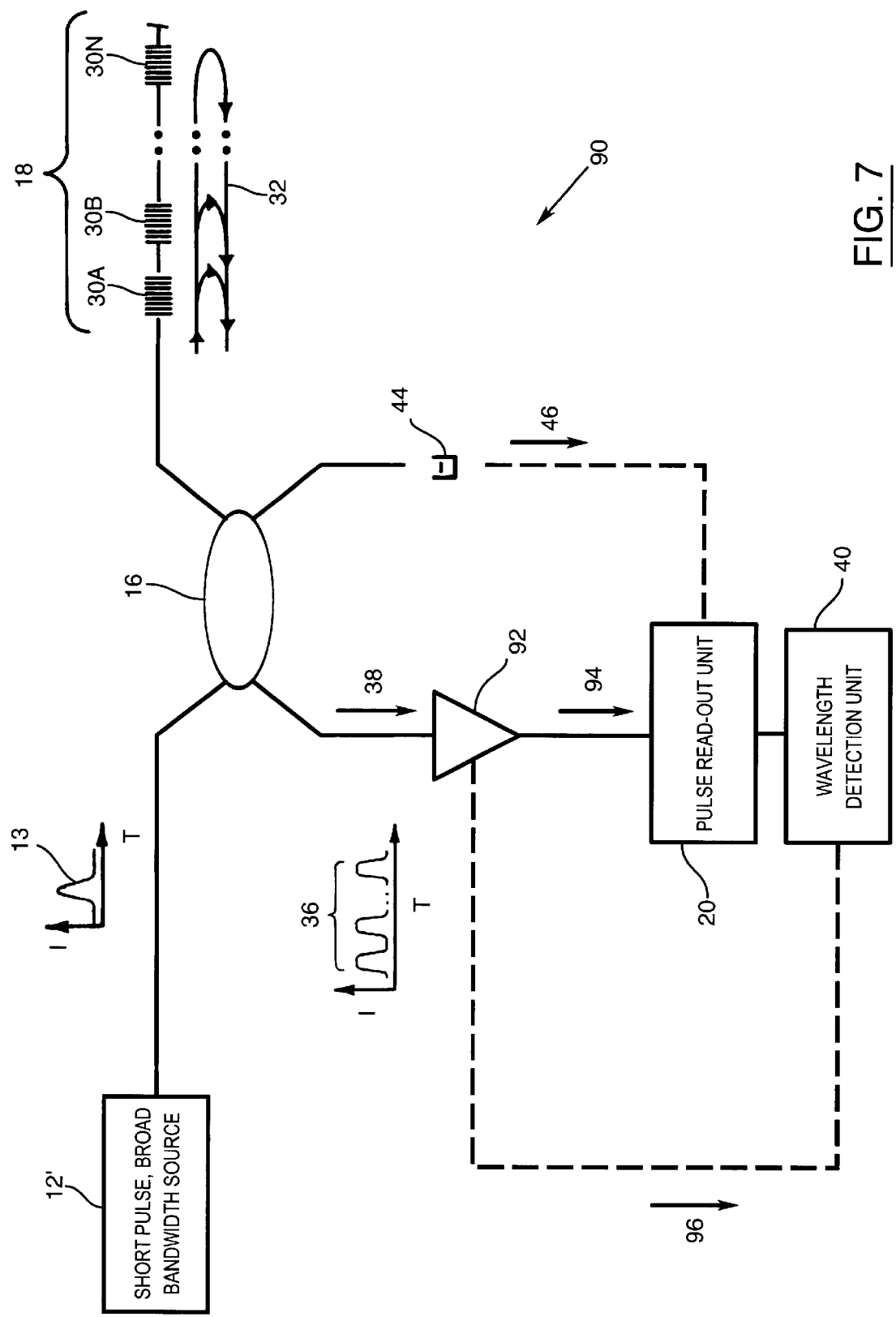
FIG. 7 is a block diagram of an alternative embodiment of a system for time division optical demultiplexing of multiple Bragg gratings in an optical waveguide.

An alternative embodiment of the invention is shown at 90 in FIG. 7. The operation of system 90 is similar to the system 10 in FIG. 1 except an optical amplifier 92 has been placed in the signal path 38 of the pulses returning from the sensors 18 to the pulse read-out unit 20. The optical amplifier 92 acts to increase the power level of the pulses 36 containing the sensor information before they are directed towards the pulse read-out unit 20 through path 9. In this configuration amplifier 92 is referred to as a signal preamplifier. In a preferred embodiment, the optical amplifier 92 is an erbium doped fiber amplifier (EDFA) operating at or near a wavelength of 1550 nm, and the wavelength of the light source 12' is chosen to be within the gain bandwidth of the amplifier 92.

The amplifier 92 may comprise a length of single mode erbium doped fiber and a semiconductor laser emitting into a single mode fiber at a wavelength capable of pumping the erbium dopants into an excited state so as to create a condition for optical gain, which in the preferred embodiment would be at or around 980 nm, and a wavelength division multiplexer to couple the pump light into the amplifier while allowing the signal path through the amplifier to remain unaffected, all of which is known in the art. Additionally, it is preferred that an optical isolator is inserted within the signal path at or around the amplifier 92 to promote unidirectional gain in the amplifier as is also known in the art. If this is not done, then spurious reflections in the signal path may create a condition of oscillation within the amplifier 92 and causing lasing thus inhibiting the accurate measurement of the sensors.

While not immediately obvious, the benefits of the addition of amplifier 92 into the optical circuit are substantial. Those skilled in the art would initially consider that the inherent amplifier noise may obscure the signal. For example, a typical amplifier produces amplified spontaneous emission, which is a continuous, but noisy, signal that is present at the output of the amplifier and is independent of the input signal. The signal may be quantified as an equivalent noise power at the input of the amplifier by $P_{eQ} = 2n_{sp}hvB$, where h is Planck's constant, v is the optical carrier frequency, B is the amplifier bandwidth, $n_{sp}$ is a factor depending on the design of the amplifier and is typically between 1.5 and 2.5. Typical uses of optical amplifiers deal with narrowband signals, thus allowing a significant portion of the noise to be filtered out by limiting the amplifier bandwidth B. However in a sensor system the wavelength of the signal is not known beforehand, thus making it impractical to filter the amplifier noise. For a system with expected variations in Bragg wavelength of 10 nm, the input noise of the amplifier would be typically 640 nW. This is compared to the power returned from a typical sensor of 5–10 nW.

Figure 8:
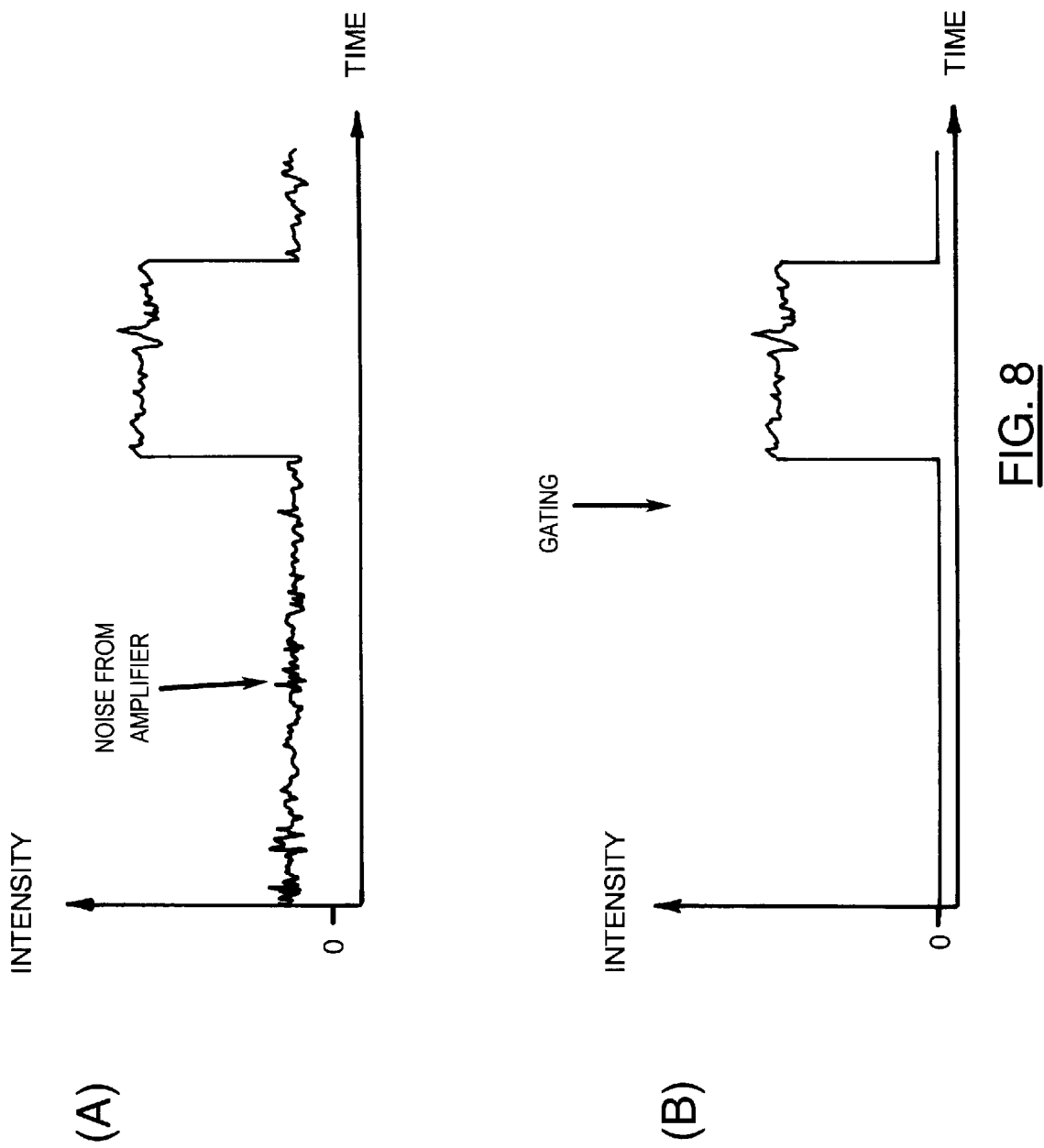
FIG. 8A shows a representative signal pulse from a single Bragg sensor in the system configuration of FIG. 7 with the addition of a continuous noisy signal that is representative of the noise from the amplifier in FIG. 7.
FIG. 8B shows a gated version of the signal of FIG. 8a with the gating period chosen to coincide with the pulse duration.

FIGS. 8A and 8B show how the majority of this excess noise can be rejected by a gating system such as pulse read-out system 20 shown in FIG. 3. In FIG. 8A, a representative signal pulse from a single sensor is shown with the addition of a continuous noisy signal that is representative of the noise from the amplifier 92. In FIG. 8B, a gated version of the signal is shown. Here the gating period was chosen to coincide with the pulse duration. It can be seen that the gate removes all of the amplifier noise except for the period of time during which the gate is open. For a typical gating duty cycle of 0.1% for the pulse read-out system 20 of FIG. 3, the input noise of the amplifier 92 could be made comparable to, or less than, that of the sensor signal.

It is also important to determine the effect of the amplification on the wavelength content of the signal. Typically optical amplifiers add intensity noise to a signal, mainly through the heterodyning of the amplified spontaneous emission with the amplified signal. The ability to recover the wavelength information can be discovered by examining the effect of the amplification on a simple wavelength detection method such as ratiometric filtering. Details of such wavelength detection methods are known by those skilled in the art, and a review of the most common methods can be found in Chapter 7 of the book Fiber Bragg Gratings by A. Othonos, Artech House, 1999. The essential idea of ratiometric filtering is that the sensor signal is split into two paths. One path is transmitted through a filter with a transmission that varies monotonically with wavelength and the other path is either unfiltered or filtered with a filter whose transmission varies monotonically in the opposite direction of the former filter. By detecting and dividing the formal signal by the latter, a new signal is produced whose value can be uniquely identified to the wavelength of the signal. In such a wavelength measurement method the intensity noise can be effectively cancelled by the process of division. As long as the variation of the filter transmission is not large over the bandwidth of the grating the variations in the signal intensity will be approximately the same in both signals, and therefore will cancel as common factors in the division.

In order to carry out this division effectively it is important to be able to subtract the continuous component of the amplifier noise so that the changes in the signal intensity will be proportionally related in the two signals of the ratiometric detection process. This may be done by monitoring the average backwards traveling noise within the optical amplifier 92 of FIG. 7 by the use of a fiber optic tap. The backward traveling noise is proportional to the forward noise that is superimposed on the sensor signals and therefore can be relayed to the wavelength detection unit 40 through path 96 to provide a measure for the subtraction of the noise level from the signal. An alternative method for discovering the noise level is to set the pulse read-out unit 20 to gate the signal at a time when no pulses are present. At this time the wavelength detection unit will only detect the contribution of the amplifier noise, thus providing a reference when the pulse-read out unit 20 is configured to gate the pulse from a sensor.

The measurement performance of the amplified signals is detailed by examining the expected sensitivity of the system as given by:

$$\Delta\lambda_{sens} = \frac{c}{\lambda^2}\sqrt{\frac{1}{12}B_g B_e + \frac{2(G-1)B_g^2 n_{sp} hv B_e}{12 G P_s} + \frac{(G-1)B_0 B_e n_{sp}^2 h^2 v^2 B_0^2}{6 G P_s^2 N} + \frac{3 e B_f B_0^2}{R G P_s + 2(G-1) R n_{sp} hv / N}} \quad (1)$$

where λ is the nominal wavelength of the gratings, c is the speed of light, $B_g$ is the optical bandwidth of the gratings, $B_e$ is the electrical bandwidth of the detection system, $B_0$ is the optical bandwidth of the sensor system, G is the amplifier gain, $P_s$ is the returned power from one sensor, R is the detector responsivity, N is the inverse of the pulse read-out unit's duty cycle and the other quantities are as defined previously. The four terms in Equation (1) can be related to physical processes as follows. The first term is signal—signal beat noise characteristic of incoherent sources. The second term is from signal-amplified spontaneous emission beat noise. The third term originates from the amplified spontaneous emission beating with itself, and the final term originates from quantum shot noise.

In Equation (1) several of the benefits of the amplifier 92 can now be seen. For typical value of N and G of 1000, it is seen that the second term of equation (1) will dominate as long as the power is comparable or less than $2n_{sp}hvB_g$. This is in comparison to the unamplified case (G=1) where the fourth term dominates. For a typical system where $B_0$ is fifty time larger than $B_g$ a gain in the wavelength sensitivity of up to 270 times could be achieved for an equivalent returned sensor power in the limit of large N and G. Furthermore instead of realizing these gains in sensitivity, the power requirements of the optical source may be reduced to achieve a comparable sensitivity with significantly lower source power. It should be noted that the third term in Equation (1) becomes dominant as the power is lowered. Therefore, in this embodiment one can advantageously replace the expensive mode locked laser 12 in system 10 in FIG. 1 with a low cost pulsed light source 12' such as a super-luminescent light emitting diode that is directly modulated by the driving signal to the diode.

The addition of the amplifier 92 also has other benefits such as increased detection bandwidth as the signal can be boosted to a power level such that the additional electrical noise of higher speed electric circuits will become negligible. Furthermore, losses in the system after the amplifier will have less effect on the measurement, as loss mostly affects the shot noise term of the detection sensitivity, which is negligible in an amplified system.

It should be noted that the system would provide similar sensitivity if other methods of wavelength detection known in the art where employed and it should also be realized that other types of pulsed optical sources and amplifiers could be used with similar results. For example the wavelength detection means may also be a phase generated carrier, a grating spectrometer, a scanning spectrometer and an interferometric analyser to mention just a few.

Figure 9:
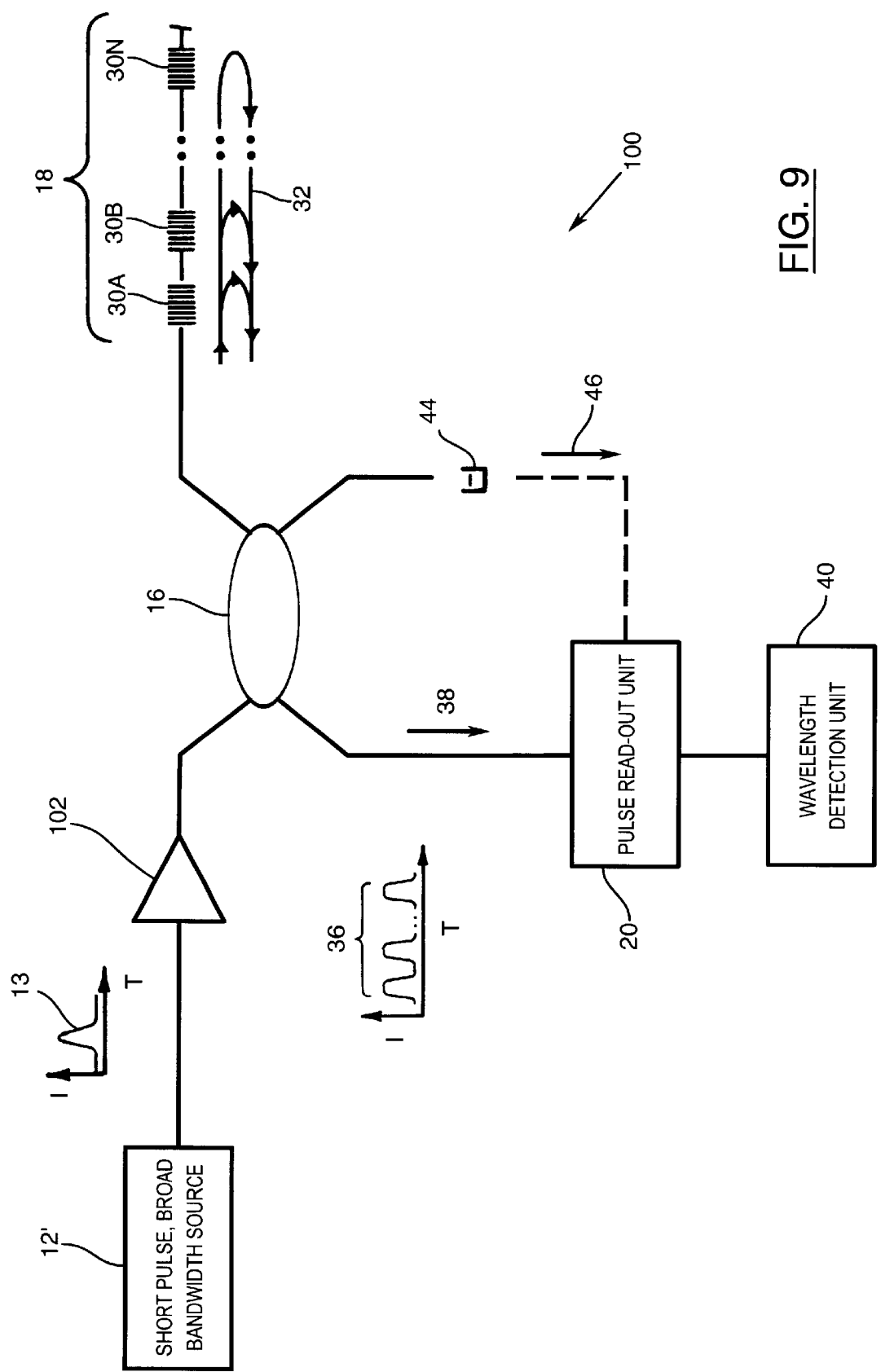
FIG. 9 is a block diagram of another alternative embodiment of a system for time division optical demultiplexing of multiple Bragg gratings in an optical waveguide.

An alternative embodiment employing the optical amplifier in a different configuration is shown at 100 in FIG. 9. In system 100, an optical amplifier 102 is placed in the optical circuit between light source 12' and the optical splitter 16. Amplifier 102 is of similar design to amplifier 91 and preferably includes an optical isolator to promote unidirectional operation. In system 100 amplifier 102 provides enhancement by boosting the signal 13 of the source. The larger the gain, the more signal that is transmitted to the wavelength detection unit 40 and the better the performance. Practically, the gain will be limited by the design of amplifier 102 and the saturation of the gain as the signal power becomes large.

Conceptually this configuration is simpler in terms of the effect on the performance of the sensor system as the source pulse 13 has yet to be wavelength encoded by the sensors. For the case of an incoherent light source such as a light emitting diode, the process of amplification is known not to alter the noise properties of the signal, and therefore the wavelength detection and pulse readout methods are left unaltered in this respect. However the act of amplification will introduce a constant, noisy signal, in addition to the amplified pulsed signal 13. If the ratio of the amplified pulsed signal power to the continuous noise power is larger then the specified maximum tolerable cross talk between sensors, which is typically a thousand or ten thousand to one, then this extra noise can be neglected. This condition is satisfied if the peak optical source power is greater than: $P_{peak} > 2Cn_{op}hvB_0$, where C is the cross talk ratio. For A system of 10 nm bandwidth, this requires a peak power of 0.6 to 6 mW from the source, which is obtainable from a super-luminescent light emitting diode. If a lower power is used, the sensors can still be interrogated accurately by setting the pulse read out unit 20 to monitor the sensors at a time when no pulse is being gated in a manner analogous to that described for the system 90 of FIG. 7. At this time the contribution of the cross-talk can be determined. However, the cross-talk cannot be eliminated by monitoring the amplifier noise level directly since the influence of the sensors on the signal is not known at the point of the amplifier.

Figure 10:
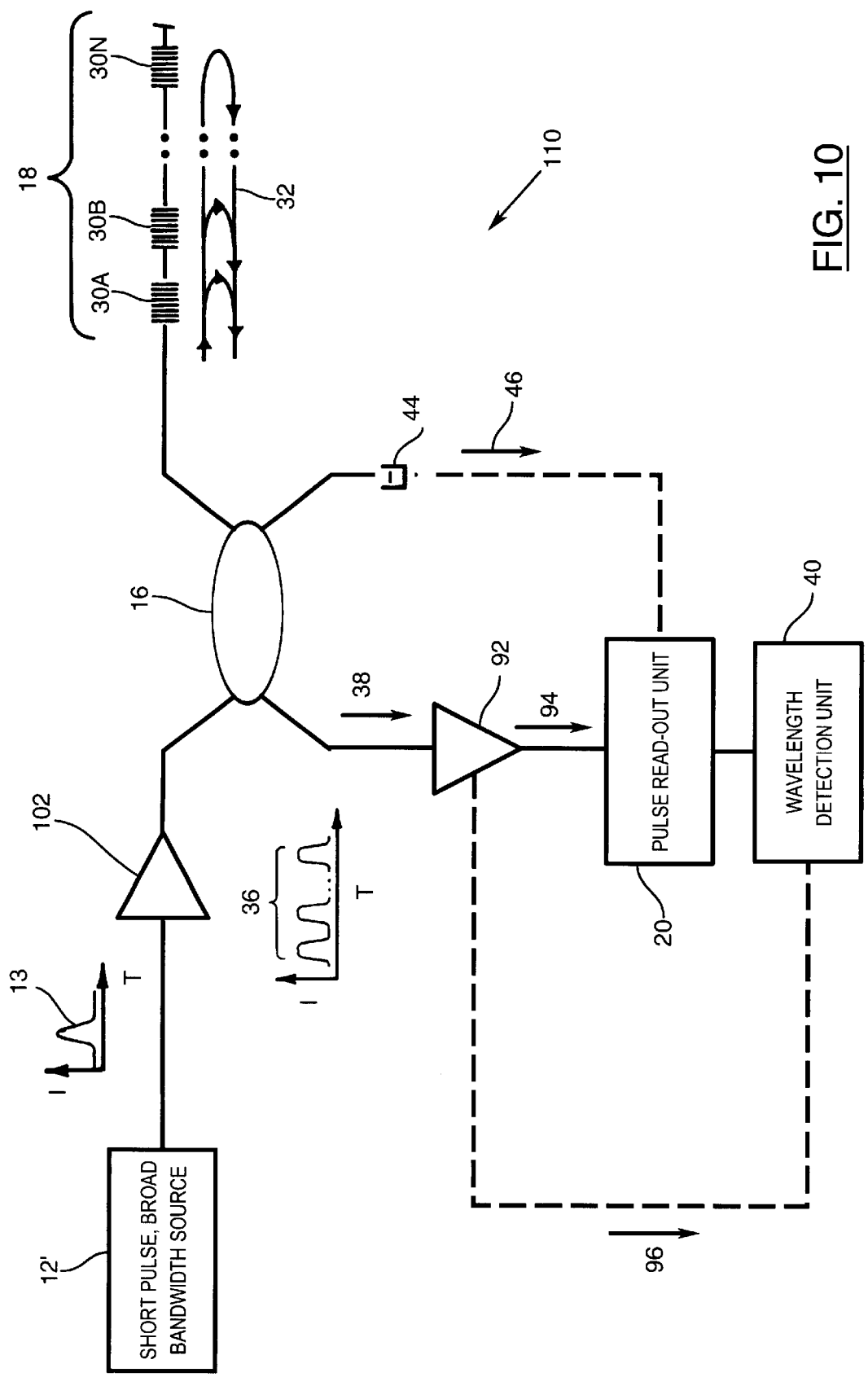
FIG. 10 is a block diagram of another alternative embodiment of a system for time division optical demultiplexing of multiple Bragg gratings in an optical waveguide.

Referring now to FIG. 10 another embodiment of a Bragg sensor system shown generally at 110 is similar to systems 90 and 100 but in this case both amplifiers 92 and 102 are used in the same system. The operation of this system follows the principles outlined for the use of amplifiers 92 and 102 in systems 90 and 100 respectively as discussed above. In system 110 the use of both amplifiers 92 and 102 provide very high measurement sensitivity at the cost of an additional amplifier.

Figure 11:
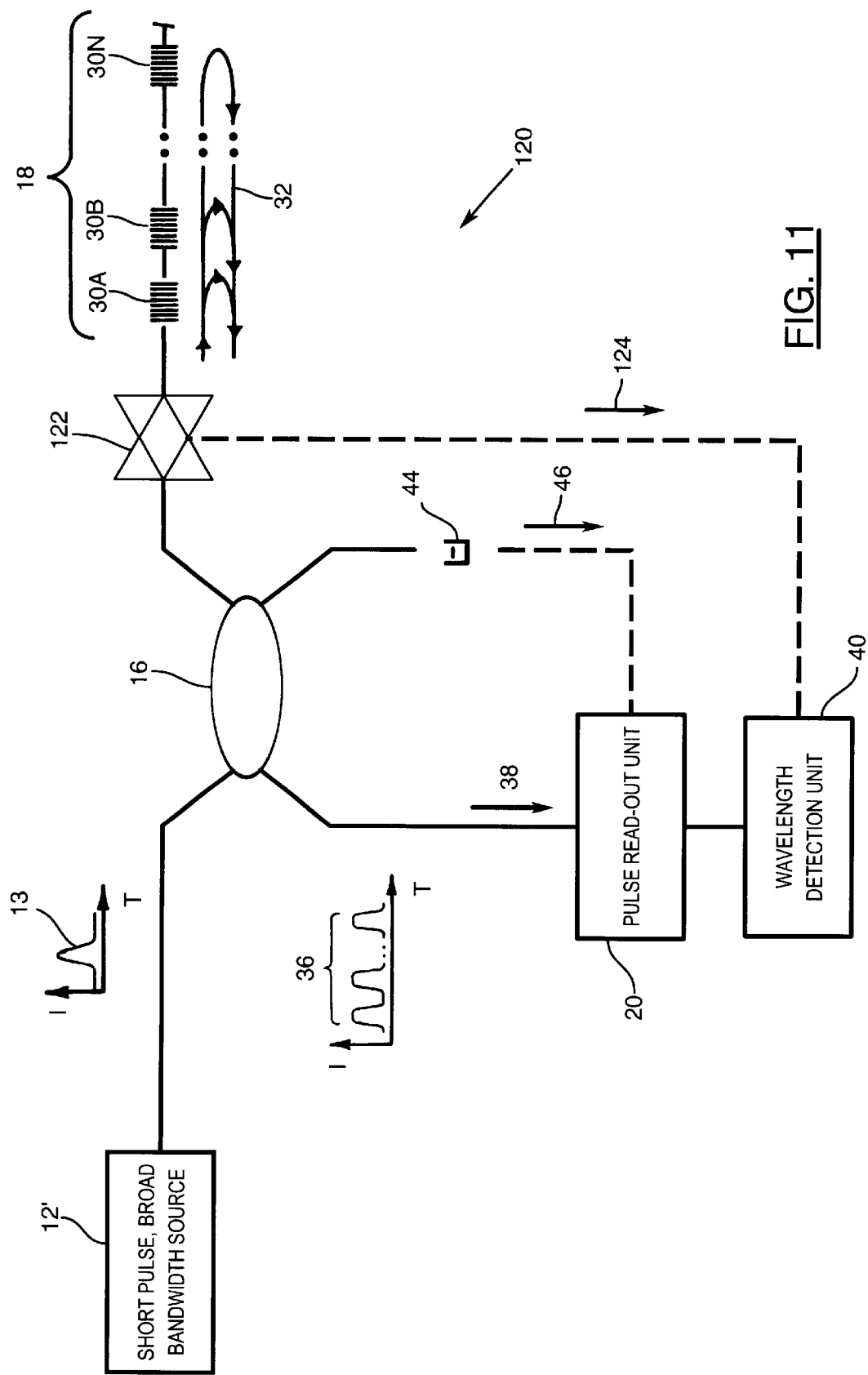
FIG. 11 is a block diagram of another alternative embodiment of a system for time division optical demultiplexing of multiple Bragg gratings in an optical waveguide.

Another alternative embodiment of a Bragg sensor system is shown generally at 120 in FIG. 11, where a single amplifier 122 has replaced the two amplifiers 92 and 102 of FIG. 10 with amplifier 122 placed between the coupler 16 and Bragg sensor array 18. In a preferred embodiment, the amplifier 122 has a similar design to the amplifier 92 except amplifier 122 lacks the optical isolator thereby permitting bi-directional amplification. The operation of system 120 is almost identical to system 110 except for the order of the signals passing through the coupler 16 and the amplifier(s) 122 or 92 and 102 and will produce similar results. In accordance with the similarity, a signal path 124 is shown that operates in a similar manner to 96 to relay the noise output status of the amplifier to the wavelength detection unit 40.

System 120 has the advantage over system 110 of using only one amplifier, however those skilled in the art will appreciate that care must be taken to avoid reflections from the direction of the coupler 16 which could create oscillation and lasing in the amplifier 122.

Figure 12:
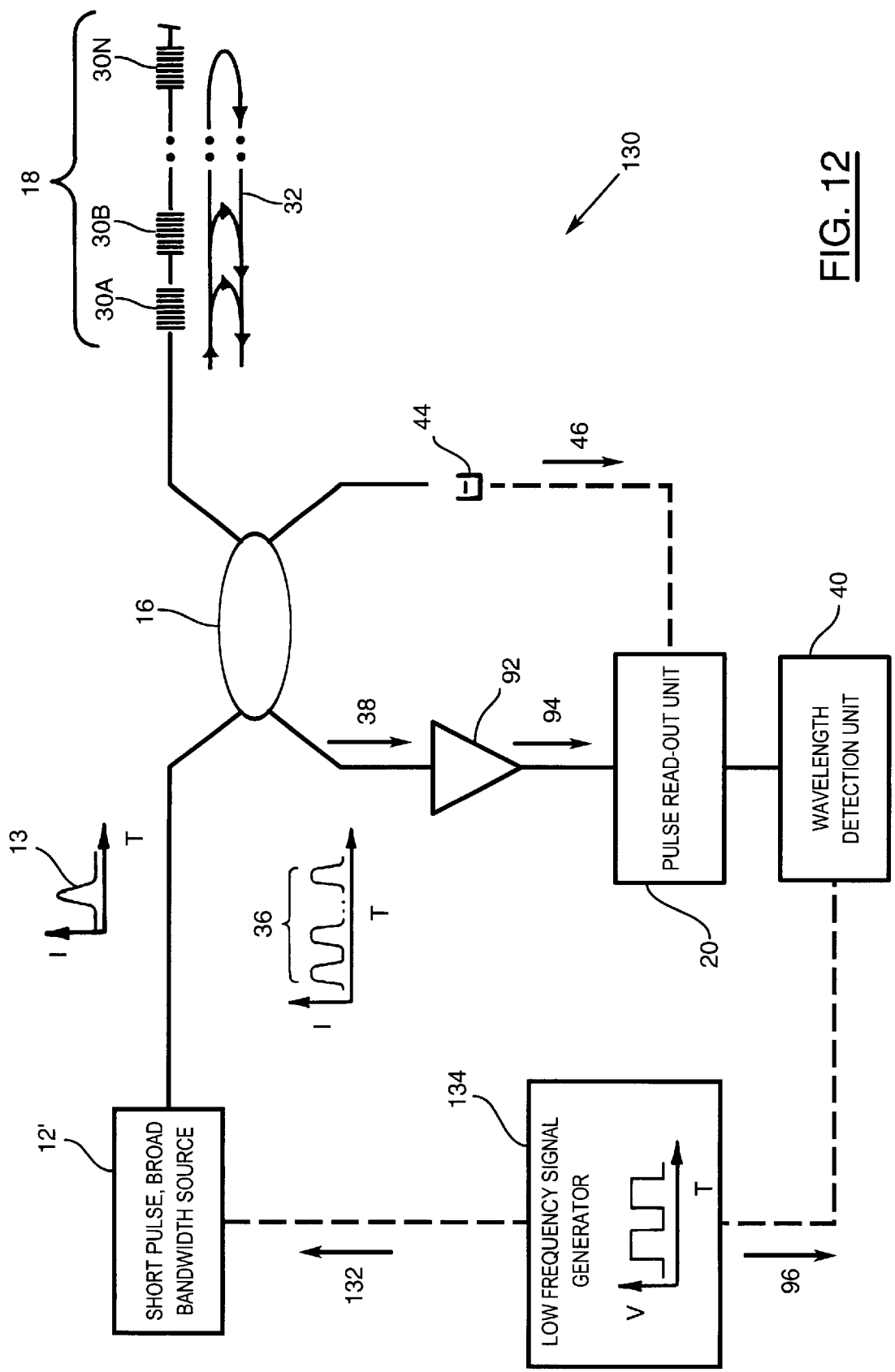
FIG. 12 is a block diagram of another alternative embodiment of a system for time division optical demultiplexing of multiple Bragg gratings in an optical waveguide.

Referring to FIG. 12, a further alternative embodiment of a Bragg sensor system is shown at 130 based on system 90 of FIG. 7. In system 130 the pulsed optical source 12' is modulated by a low frequency signal 132 produced by a signal generator 134 connected to optical source 12'. The low frequency signal has a typical frequency in the kilohertz range. This modulation is also passed onto the wavelength detection unit 40 to serve as a reference for synchronous detection. To those skilled in the art, it can be seen that this provides a method to differentiate between the amplified signals from the optical source 12' and the noise from the amplifier 92. It can also be seen in a straightforward and analogous manner how such a method of synchronous detection may also be applied to the systems 100, 110 and 120.

Figure 13:
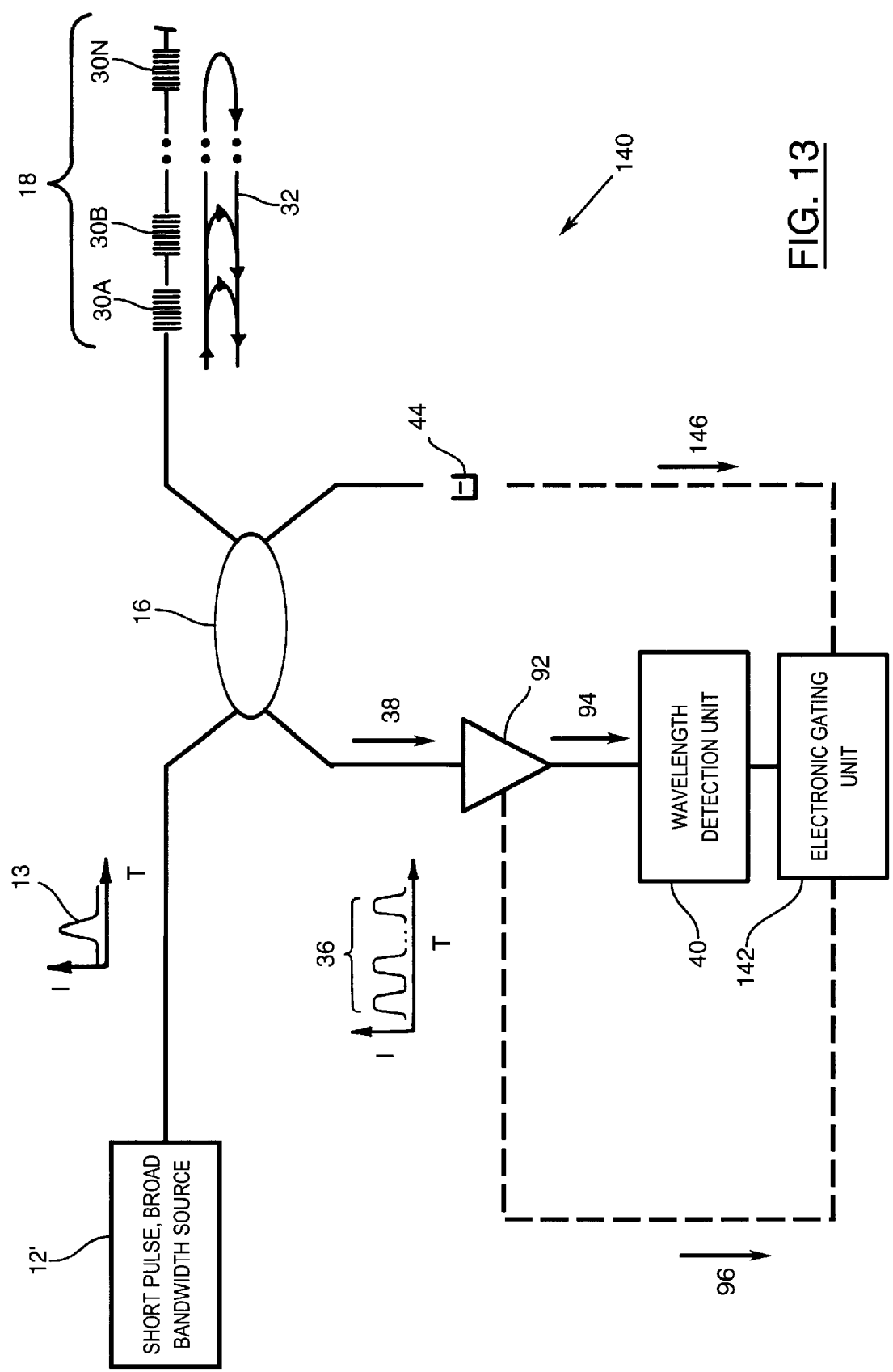
FIG. 13 is a block diagram of another embodiment of a system for for time division optical demultiplexing of multiple Bragg gratings in an optical waveguide.

FIG. 13 shows another alternative embodiment of a Bragg sensor system shown generally at 140 that is similar to system 90 of FIG. 7. In system 140, the pulse readout unit 20 detailed in FIG. 3, is replaced by an electronic gating circuit 142, which is placed after the appropriate optical wavelength operations have been performed in the wavelength detection unit 40. Here the wavelength detection unit 40 is the same as described previously except operating now at electrical frequencies high enough such that the pulses returning from the gratings 18 can be distinguished in time in the electrical signal. Each of these high-speed electrical pulses will now contain the wavelength information of their respective sensor grating 30A to 30N. These pulses are then passed to the electronic gating unit 142 where the pulses from the different sensors are isolated and measured for their wavelength information in a similar manner to the gating action performed on the optical signal in unit 20 except now performed electronically instead of optically. The signal from the reference detector is relayed to the electronic gating unit 142 through path 146 to serve as a timing reference.

The presence of the optical amplifier 92 provides sufficient signal power such that the electronics can be operated at the frequencies required for gating the signal at speeds comparable to that provided by the pulse read-out unit 20. The extra power from the amplifier causes the noise levels introduced by the high-speed electronics to be small in comparison to that of the signal whereas under normal unamplified operation as described for system 10 in FIG. 2, the electronic noise would overwhelm the signal. Methods of time gating the signals using electronic circuits are known in the art and a review of such methods is provided in the paper by Kersey et. al. in the Journal of Lightwave Technology vol. 15, pp. 1442–1462. 1997.

It can also be seen that the use of such electronic gating can be extended to the configurations of systems 100, 110, and 120 in an analogous manner provided the use of amplifiers in each configuration is sufficient to overcome the addition of noise from the electronic circuits.

A significant advantage briefly mentioned above which can be realized using the embodiments of FIGS. 7, 9, 10, 11, 12 and 13 is that the mode-locked fiber laser source 12 of FIGS. 1 to 3 may be replaced by much more economical light sources such as, but not limited to, semiconductor laser diodes, edge emitting laser diodes, light emitting diodes or a more general light emitting diode or an amplified spontaneous emission source.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A Bragg grating sensor device, comprising:
   a) a broadband light source adapted to produce optical pulses;
   b) a Bragg sensor array including at least two spaced apart Bragg gratings located in an optical waveguide, said Bragg sensor array being optically coupled to said light source; and
   c) an optical modulator optically coupled to said Bragg sensor array for receiving optical signals reflected from said Bragg sensor array, wavelength detection means optically coupled to said optical modulator for analysing wavelength content of said optical signals, adjustable gating means connected to said optical modulator for gating said optical modulator for selectively transmitting optical signals reflected from a preselected Bragg grating in said Bragg sensor array to said wavelength detection means.

2. The device according to claim 1 wherein said optical waveguide is an optical fiber.

3. The device according to claim 2 wherein said optical fiber is a single mode optical fiber, and wherein said light source, said Bragg sensor array, said optical modulator and said wavelength detection means are optically coupled in an optical fiber network using single mode optical fibers.

4. The device according to claim 2 wherein said adjustable gating means includes a variable timer circuit controller connected to said optical modulator for switching open and closed said optical modulator at selectively adjustable times after production of said optical pulses.

5. The device according to claim 4 wherein said optical fiber is a single mode optical fiber, and wherein said at least two Bragg gratings is a plurality of Bragg gratings spaced an effective minimum distance apart from each other.

6. The device according to claim 5 wherein said light source is adapted to produce optical pulses having a pulse width shorter than a time required for an optical pulse to travel approximately twice a distance between any two spatially closest Bragg gratings in said at least two Bragg gratings.

7. The device according to claim 5 wherein said light source is adapted to produce optical pulses with a period between said light pulses being greater than a time for an optical pulse to travel approximately twice a distance from a first Bragg sensor closest to said light source to a last Bragg grating farthest from said light source.

8. The device according to claim 7 wherein said variable timer circuit controller holds said optical modulator open permitting optical signals to be transmitted to said wavelength detection means for a period of time longer than said pulse width.

9. The device according to claim 8 wherein said optical modulator is an electro-optic modulator, and wherein said variable timer circuit controller includes an electrical trigger pulse generator connected to said electro-optic modulator for applying trigger voltage pulses to said electro-optic modulator for switching to said electro-optic modulator to a transmission state in which said optical signals propagate to said wavelength detection means, said electrical pulse generator including adjustment means for adjusting a length of time said trigger voltage pulses are applied to said electro-optic modulator for controlling a length of time said electro-optic modulator remains in said transmission state.

10. The device according to claim 9 wherein said variable timer circuit controller includes a variable electrical delay generator connected to said electrical trigger pulse generator for controlling when said electrical trigger pulse generator applies said electrical trigger pulses to said electro-optic modulator.

11. The device according to claim 10 wherein said variable electrical delay generator is adapted to be triggered by production of optical pulses such that said electro-optic modulator is gated to transmit said optical signals an adjustable time after production of said optical pulses.

12. The device according to claim 3 wherein said optical fiber network includes a first optical fiber section connected between said light source and an optical coupler, a second optical fiber section connected at one end thereof to said optical coupler having said at least two spaced apart Bragg gratings located therein, and a third optical fiber section connected at one end thereof to said optical coupler optically coupled to said optical modulator.

13. The device according to claim 1 wherein said optical modulator is a semiconductor electro-absorption modulator.

14. The device according to claim 1 wherein said optical modulator is a Mach-Zehnder integrated optical modulator.

15. The device according to claim 1 wherein said light source is a mode locked laser.

16. The device according to claim 9 wherein said electro-optic modulator is a lithium niobate opto-electronic modulator.

17. The device according to claim 12 including a polarization control element in said optical fiber network between said Bragg sensor array and said electro-optical modulator for controlling a state of polarization of said optical pulses reflected by said Bragg gratings.

18. The device according to claim 1 including at least one optical amplifier optically coupled either between said light source and said Bragg sensor array or between said Bragg sensor array and said optical modulator.

19. The device according to claim 18 wherein said optical waveguide is an optical fiber, and wherein said light source, said Bragg sensor array, said optical modulator and said wavelength detection means are optically coupled in an optical fiber network using optical fibers.

20. The device according to claim 19 wherein said optical fiber network includes a first optical fiber section connected between said light source and an optical coupler, a second optical fiber section connected at one end thereof to said optical coupler having said at least two spaced apart Bragg gratings located therein, and a third optical fiber section connected at one end thereof to said optical coupler and the other end thereof being optically coupled to said optical modulator.

21. The device according to claim 20 wherein said at least one optical amplifier is a unidirectional optical amplifier optically coupled to said first optical fiber section between said light source and said optical coupler.

22. The device according to claim 21 wherein said optical amplifier is selected from the group consisting of rare-earth doped fiber amplifiers, fiber Raman amplifiers and semiconductor-based optical amplifiers.

23. The device according to claim 21 wherein said optical amplifier is an erbium-doped fiber amplifier pumped by a semiconductor laser.

24. The device according to claim 20 wherein said at least one optical amplifier is a unidirectional optical amplifier optically coupled to said third optical fiber section between said optical coupler and said optical modulator.

25. The device according to claim 24 wherein said unidirectional optical amplifier is selected from the group consisting of rare-earth doped fiber amplifiers, fiber Raman amplifiers and semiconductor-based optical amplifiers.

26. The device according to claim 24 wherein said unidirectional optical amplifier is an erbium-doped fiber amplifier pumped by a semiconductor laser.

27. The device according to claim 20 wherein said at least one optical amplifier is a bidirectional optical amplifier optically coupled to said second optical fiber section between said optical coupler and said Bragg sensor array.

28. The device according to claim 27 wherein said bi-directional optical amplifier is selected from the group consisting of rare-earth doped fiber amplifiers, fiber Raman amplifiers and semiconductor-based optical amplifiers.

29. The device according to claim 27 wherein said bi-directional optical amplifier is an erbium-doped fiber amplifier pumped by a semiconductor laser.

30. The device according to claim 18 wherein said broadband light source is one of a semiconductor laser diode, a light emitting diode, a super-luminescent light emitting diode, an edge-emitting light emitting diode, an amplified spontaneous emission light source and a mode-locked fiber laser.

31. The device according to claim 18 wherein said light source is a super-luminescent light emitting diode.

32. The device according to claim 20 wherein said at least one optical amplifier includes a first unidirectional optical amplifier optically coupled to said first optical fiber section between said light source and said optical coupler and a second unidirectional optical amplifier optically coupled to said third optical fiber section between said optical coupler and said optical modulator.

33. The device according to claim 20 wherein said at least one optical amplifier includes a unidirectional optical amplifier optically coupled to said third optical fiber section between said optical coupler and said optical modulator and a bidirectional optical amplifier optically coupled to said second optical fiber section between said optical coupler and said Bragg sensor array.

34. The device according to claim 20 wherein said at least one optical amplifier includes a unidirectional optical amplifier optically coupled to said first optical fiber section between said light source and said optical coupler and a bidirectional optical amplifier optically coupled to said second optical fiber section between said optical coupler and said Bragg sensor array.

35. The device according to claim 20 wherein said at least one optical amplifier includes a first unidirectional optical amplifier optically coupled to said first optical fiber section between said light source and said optical coupler and a second unidirectional optical amplifier optically coupled to said third optical fiber section between said optical coupler and said optical modulator, and a bidirectional optical amplifier optically coupled to said second optical fiber section between said optical coupler and said Bragg sensor array.

36. The device according to claim 18 including a signal generator connected to said light source and said wavelength detection means, and wherein said broadband light source adapted to produce optical pulses is modulated by a low frequency signal produced by said signal generator, wherein said wavelength detection means includes synchronous detection means, and wherein said modulation applied to said wavelength detection means provides a reference signal for said synchronous detection means.

37. The device according to claim 36 wherein said low frequency signal is in the kilohertz range.

38. The device according to claim 21 including a signal generator connected to said light source and said wavelength detection means, and wherein said broadband light source adapted to produce optical pulses is modulated by a low frequency signal produced by said signal generator, wherein said wavelength detection means includes synchronous detection means, and wherein said modulation applied to said wavelength detection means provides a reference signal for said synchronous detection means.

39. The device according to claim 24 including a signal generator connected to said light source and said wavelength detection means, and wherein said broadband light source adapted to produce optical pulses is modulated by a low frequency signal produced by said signal generator, wherein said wavelength detection means includes synchronous detection means, and wherein said modulation applied to said wavelength detection means provides a reference signal for said synchronous detection means.

40. The device according to claim 27 including a signal generator connected to said light source and said wavelength detection means, and wherein said broadband light source adapted to produce optical pulses is modulated by a low frequency signal produced by said signal generator, wherein said wavelength detection means includes synchronous detection means, and wherein said modulation applied to said wavelength detection means provides a reference signal for said synchronous detection means.

41. The device according to claim 18 including an optical tap optically coupled to said optical amplifier, and wherein said optical tap is used to monitor an average noise level originating in said optical amplifier added to the optical signals reflected from said Bragg sensor array, and wherein said noise level is used as a reference level for said wavelength detection means.

42. The device according to claim 41 wherein said optical tap couples a portion of backward traveling noise in said optical amplifier, wherein forward traveling noise in said optical amplifier is determined from a measurement of the backward traveling noise from said optical tap.

43. The device according to claim 18 wherein the signals from said Bragg sensor array are gated by said optical modulator at a time such that no signal originating from said light source is transmitted through said optical modulator to said wavelength modulator, and wherein the detection of the signal at said time gives an indication of the noise from said amplifier, and wherein the signal at said time is used as a reference for said wavelength detection means.

44. A Bragg grating sensor device, comprising:
a) a broadband light source adapted to produce optical pulses;
b) a Bragg sensor array including at least two spaced apart Bragg gratings located in an optical waveguide, said Bragg sensor array being optically coupled to said light source;
c) wavelength detection means optically coupled to said Bragg sensor array for analysing wavelength content of said optical signals reflected from said Bragg sensor array;
d) at least one optical amplifier optically coupled either between said light source and said Bragg sensor array or between said Bragg sensor array and said wavelength detection means; and
e) electronic gating means connected to said wavelength detection means for gating signals produced by said wavelength detection means for selectively analysing optical signals reflected from a preselected Bragg grating in said Bragg sensor array.

45. The device according to claim 44 wherein said optical waveguide is an optical fiber.

46. The device according to claim 45 wherein said broadband light source, said Bragg sensor array and said wavelength detection means are optically coupled in an optical fiber network using optical fibers.

47. The device according to claim 46 wherein said optical fibers are single mode optical fibers, and wherein said at least two Bragg gratings is a plurality of Bragg gratings spaced an effective minimum distance apart from each other.

48. The device according to claim 47 wherein said broadband light source is adapted to produce optical pulses having a pulse width shorter than a time required for an optical pulse to travel approximately twice a distance between any two spatially closest Bragg gratings in said at least two Bragg gratings.

49. The device according to claim 47 wherein said broadband light source is adapted to produce optical pulses with a period between said light pulses being greater than a time for an optical pulse to travel approximately twice a distance from a first Bragg sensor closest to said light source to a last Bragg grating farthest from said light source.

50. The device according to claim 46 wherein said optical fiber network includes a first single mode optical fiber section connected between said light source and an optical coupler, a second single mode optical fiber section containing said Bragg sensor array connected at one end thereof to said optical coupler, and a third single mode optical fiber section connected at one end thereof to said optical coupler optically coupled to said wavelength detection means.

51. The device according to claim 44 wherein said broadband light source is one of a semiconductor laser diode, a light emitting diode, a super-luminescent light emitting diode, an edge-emitting light emitting diode, an amplified spontaneous emission light source and a mode-locked fiber laser.

52. The device according to claim 46 including an optical tap optically coupled to said optical amplifier, and wherein said optical tap is used to monitor an average noise level originating in said optical amplifier added to the optical signals reflected from said Bragg sensor array, and wherein said noise level is used as a reference level for said wavelength detection means.

53. The device according to claim 52 wherein said optical tap couples a portion of backward traveling noise produced in said optical amplifier, wherein forward traveling noise produced in said optical amplifier is determined from a measurement of the backward traveling noise from said optical tap.

54. The device according to claim 44 wherein said electronic gating means is used to monitor the signal at a time when no signal originating from said light source is present, and wherein the monitored signal at said time gives an indication of the noise from said amplifier, and wherein the signal at said time is used as a reference for said wavelength detection means.

55. The device according to claim 3 wherein said plurality of Bragg gratings have substantially equal center wavelengths.

56. A method for time domain demultiplexing a serial fiber Bragg grating array comprising at least two Bragg gratings spaced apart from each other in a sensor network, comprising:

directing optical pulses from a broadband light along said sensor network toward said Bragg grating array; and gating optical signals reflected by said Bragg sensor array to preselect optical signals reflected from a selected Bragg grating, said optical signals being gated using a gated optical modulator, and spectrally analyzing said preselected optical signals to determine a wavelength content of said reflected optical signals.

57. A method for time domain demultiplexing a serial fiber Bragg grating array comprising at least two Bragg gratings spaced apart from each other in a sensor network, comprising:

directing optical pulses from a broadband light along said sensor network toward said Bragg grating array;

amplifying one of said light pulses from said broadband light source and optical signals reflected from said Bragg sensor array; and detecting optical signals reflected by said Bragg sensor array by a wavelength detection means and gating signals produced by said wavelength detection means to preselect optical signals reflected from a selected Bragg grating, and spectrally analyzing said preselected optical signals to determine a wavelength content of said reflected optical signals.

58. The method according to claim 57 wherein said optical signals reflected by a preselected Bragg grating are gated using an electronically gated wavelength detection means.

59. The method according to claim 56 wherein said light source is adapted to produce optical pulses having a pulse width shorter than a time required for a light pulse to travel approximately twice a distance between any two spatially closest Bragg gratings in said at least two Bragg gratings.

60. The method according to claim 59 wherein said light source is adapted to produce optical pulses with a period between said optical pulses being greater than a time for an optical pulse to travel approximately twice a distance from a first Bragg grating closest to said light source to a last Bragg grating farthest from said light source in said Bragg sensor array.

61. The method according to claim 56 including amplifying one of said light pulses from said broadband light source and optical signals reflected from said Bragg sensor array.

* * * * *